O. H. EGGERT.
MIRROR ATTACHMENT.
APPLICATION FILED NOV. 23, 1921.

1,438,103.

Patented Dec. 5, 1922.

Inventor:-
O. H. Eggert.

By
Attorneys.

Patented Dec. 5, 1922.

1,438,103

UNITED STATES PATENT OFFICE.

OTTO H. EGGERT, OF CHICAGO, ILLINOIS.

MIRROR ATTACHMENT.

Application filed November 23, 1921. Serial No. 517,350.

*To all whom it may concern:*

Be it known that I, OTTO H. EGGERT, a citizen of the United States, residing at Chicago, in the county of Cook and State of Illinois, have invented new and useful Improvements in Mirror Attachments, of which the following is a specification.

This invention has for its object to provide an electric light fixture with a mirror designed more particularly to be used when shaving, a novel and improved support being provided which enables the mirror to be positioned on either side of the lamp to obtain a good light on both sides of the face.

The object stated is attained by means of a combination and arrangement of parts to be hereinafter described and claimed, and in order that the same may be better understood, reference is had to the accompanying drawing forming a part of this specification.

Figure 2:
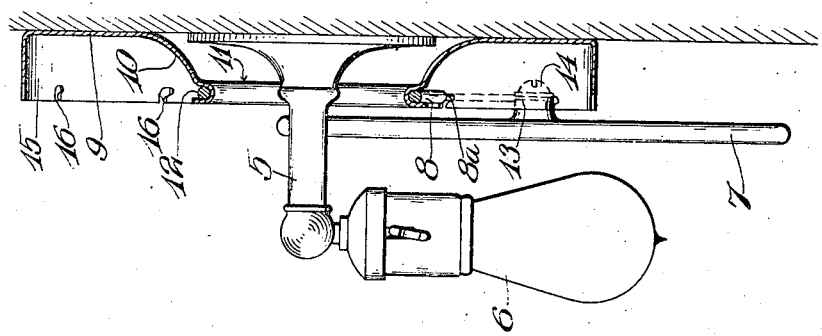
Figure 1:
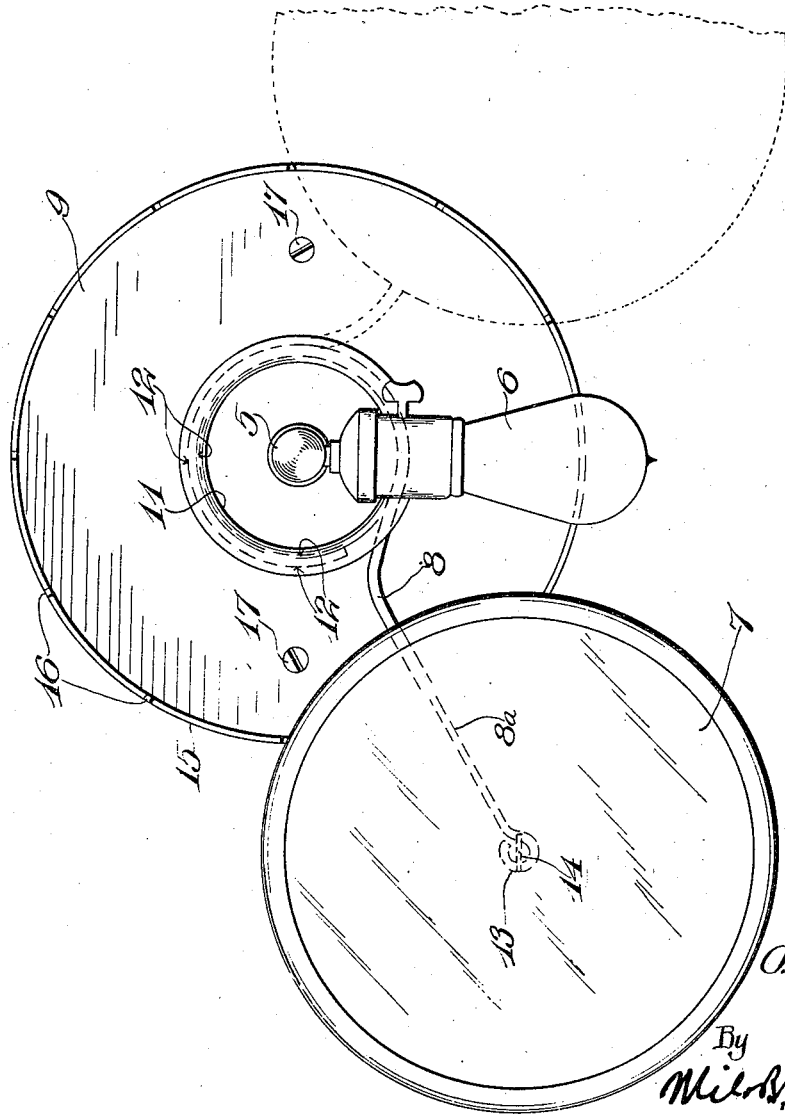

In the drawing, Figure 1 is a front elevation of the mirror attachment, and Fig. 2 is a side elevation thereof, partly in section on the line 2—2 of Fig. 1.

Referring specifically to the drawing, the invention is shown applied to a simple electric light fixture consisting of a horizontal bracket arm 5 carrying a pendent incandescent electric lamp 6 at its outer end, and secured at its inner end to the wall or other support in the conventional manner which need not be described as it is immaterial and forms no part of the present invention, the same being readily applicable to any standard fixture of the type shown.

At 7 is shown a mirror which is positioned rearwardly of the lamp 6 and carried by the outer end of a rotatably supported bracket arm 8 so that the mirror can be swung to a position on either side of or to any other position relative to the lamp. Fig. 1 shows in full lines the mirror on one side of the lamp, and its position on the other side of the lamp is shown by dotted lines. After placing the mirror on either side of the lamp, it is locked by a means to be presently described. With the mirror positioned as shown in full lines in Fig. 1, a person looking into the mirror will have the right side of the face illuminated, and when the mirror is swung over on the other side of the lamp, the left side of the face will be illuminated.

For the purpose of supporting the bracket arm 8, there is mounted on the wall from which the lamp bracket arm 5 extends, a circular base plate 9 having a central opening which is provided with a raised rim or outstanding marginal flange 10. The arm 5 extends through this opening, and the flange 10 has its edge channeled, as shown at 11 to provide an annular seat for a loop 12 formed at the inner end of the bracket arm 8, said loop being free to slide in the channel, whereby a pivotal support for the bracket arm is had so that it may be swung to position the mirror 7 on either side of the lamp 6 as hereinbefore described. The outer end of the arm 8 is fashioned into an eye 13 through which a screw 14 is passed into the back of the mirror frame for securing the same to the arm.

The base plate 9 is also provided with an outstanding peripheral flange 15 having its edge provided with a series of notches 16. The arm 8 is adapted to slide along the notched edge of the flange 15 when it is swung to adjust the mirror 7 to the desired position relative to the lamp 6, and by allowing the arm to enter one of the notches 16, the mirror is securely held. That portion of the arm 8 which is adapted to be placed in the notches 16, is flattened, as shown at $8^a$, and the arm is resilient and has sufficient lateral tension to remain in the notch in which it may be placed and not become accidentally disengaged.

The base plate 9 may be secured to the wall or other support by screws or other suitable fasteners 17.

I claim:

1. The combination with a lighting fixture consisting of a horizontal bracket arm and a lamp at the outer end thereof; of a mirror having a supporting arm which is rotatably mounted, said mirror being positioned to the rear of the lamp and adjustable by the swing of the supporting arm for location laterally with respect to the lamp on either side thereof, and means for locking the supporting arm.

2. The combination with a lighting fixture consisting of a horizontal bracket arm and a lamp at the outer end thereof; of a base plate having an opening through which the bracket arm passes, said opening having an annular outstanding marginal flange the edge of which is channeled, a mirror, and an arm supporting at its outer end the mirror and having its inner end looped and seating slidably in the channel of the aforesaid flange.

3. The combination with a lighting fixture consisting of a horizontal bracket arm and a lamp at the outer end thereof; of a base plate having an opening through which the bracket arm passes, said opening having an annular outstanding marginal flange the edge of which is channeled, a mirror, and an arm supporting at its outer end the mirror and having its inner end looped and seating slidably in the channel of the aforesaid flange, the base plate also having an outstanding marginal flange provided with notches in its edge adapted to be entered by the mirror supporting arm.

In testimony whereof I affix my signature.

OTTO H. EGGERT.